United States Patent
Manley et al.

(10) Patent No.: US 9,935,915 B2
(45) Date of Patent: Apr. 3, 2018

(54) SYSTEM AND METHOD THAT BRIDGES COMMUNICATIONS BETWEEN MULTIPLE UNFIED COMMUNICATION(UC) CLIENTS

(71) Applicant: ClearOne, Inc., Salt Lake City, UT (US)

(72) Inventors: Peter H. Manley, Draper, UT (US); Bret Harris, Orem, UT (US); Derek L. Graham, South Jordan, UT (US); Michael Tilelli, Syracuse, UT (US); Balasubramaniyan Krishnamoorthy, Salt Lake City, UT (US)

(73) Assignee: ClearOne, Inc., Salt Lake City, UT (US)

( * ) Notice: Subject to any disclaimer, the term of this patent is extended or adjusted under 35 U.S.C. 154(b) by 0 days.

(21) Appl. No.: 15/151,046

(22) Filed: May 10, 2016

(65) Prior Publication Data
US 2017/0054677 A1 Feb. 23, 2017

Related U.S. Application Data

(63) Continuation of application No. 13/633,033, filed on Oct. 1, 2012, now abandoned.

(60) Provisional application No. 61/541,990, filed on Sep. 30, 2011.

(51) Int. Cl.
*H04L 12/58* (2006.01)

(52) U.S. Cl.
CPC ............. *H04L 51/36* (2013.01); *H04L 51/18* (2013.01)

(58) Field of Classification Search
CPC combination set(s) only.
See application file for complete search history.

(56) References Cited

U.S. PATENT DOCUMENTS

| | | |
|---|---|---|
| 5,454,041 A | 9/1995 | Davis |
| 5,890,017 A | 3/1999 | Tulkoff et al. |
| 6,075,571 A | 6/2000 | Kuthyar et al. |
| 6,785,894 B1 | 8/2004 | Ruberg |

(Continued)

FOREIGN PATENT DOCUMENTS

| | | |
|---|---|---|
| DE | 10358846 A1 | 7/2005 |
| EP | 0955765 A1 | 11/1999 |

(Continued)

*Primary Examiner* — Chris Parry
*Assistant Examiner* — Caroline Jahnige
(74) *Attorney, Agent, or Firm* — Matthew J. Booth PC; Matthew J. Booth (57) ABSTRACT

This disclosure describes a system and method that bridges communications between multiple unified communication (UC) clients. This disclosure provides a UC bridging tool configured to execute computer implemented instructions using the processor and memory. The processor is further configured to: receive UC client specific human interface device HID commands from a plurality of UC clients with a UC client driver module, wherein each UC client driver is configured to translate UC client specific human interface device (HID) commands for each UC client driver to a common format; receive HID commands in the common format and translate the HID commands from the common format into a device specific format with a UC audio assistant module; pass the HID commands in the device specific format to an output device with a device specific driver module that further comprises a set of device specific drivers.

16 Claims, 3 Drawing Sheets

(56) References Cited

U.S. PATENT DOCUMENTS

| | | | |
|---|---|---|---|
| 7,113,992 B1 | 9/2006 | Even | |
| 7,701,926 B2 | 4/2010 | Gavish et al. | |
| 8,035,679 B2 | 10/2011 | Eisenberg et al. | |
| 8,200,758 B2 | 6/2012 | Serr et al. | |
| 8,428,228 B1 | 4/2013 | Baxter | |
| 8,446,451 B2 | 5/2013 | Eshkoli et al. | |
| 8,456,510 B2 | 6/2013 | King et al. | |
| 8,671,149 B1 | 3/2014 | Baxter | |
| 8,692,864 B2 | 4/2014 | Angelo | |
| 8,745,256 B2 | 6/2014 | Hsiao | |
| 8,872,880 B1 | 10/2014 | Matselyukh et al. | |
| 9,781,386 B2 | 10/2017 | Natan et al. | |
| 2002/0159394 A1 | 10/2002 | Decker et al. | |
| 2004/0047342 A1 | 3/2004 | Gavish et al. | |
| 2004/0054747 A1* | 3/2004 | Breh | H04L 69/08 709/208 |
| 2005/0249196 A1 | 11/2005 | Ansari et al. | |
| 2007/0127668 A1 | 6/2007 | Ahya et al. | |
| 2007/0156813 A1 | 7/2007 | Galvez et al. | |
| 2007/0166007 A1 | 7/2007 | Hirai | |
| 2007/0177529 A1* | 8/2007 | Provino | H04L 12/66 370/260 |
| 2007/0189277 A1 | 8/2007 | Yang | |
| 2007/0288227 A1 | 12/2007 | Kim et al. | |
| 2008/0010482 A1* | 1/2008 | Tsang | H04N 5/4403 714/2 |
| 2008/0120675 A1 | 5/2008 | Morad et al. | |
| 2009/0210789 A1 | 8/2009 | Thakkar et al. | |
| 2009/0238173 A1 | 9/2009 | Lin | |
| 2010/0005497 A1 | 1/2010 | Maresca | |
| 2010/0008419 A1 | 1/2010 | Wu et al. | |
| 2010/0146085 A1 | 6/2010 | Van Wie et al. | |
| 2010/0180224 A1 | 7/2010 | Willard et al. | |
| 2010/0303061 A1 | 12/2010 | Wan et al. | |
| 2010/0304860 A1 | 12/2010 | Gault et al. | |
| 2011/0075864 A1 | 3/2011 | Hagiwara et al. | |
| 2011/0279634 A1 | 11/2011 | Periyannan et al. | |
| 2012/0098921 A1 | 4/2012 | Stedman et al. | |
| 2012/0196614 A1 | 8/2012 | Arora et al. | |
| 2012/0297383 A1* | 11/2012 | Meisner | G06F 3/165 718/1 |
| 2013/0031185 A1 | 1/2013 | Wyatt | |
| 2013/0097244 A1 | 4/2013 | Manley et al. | |
| 2013/0097333 A1 | 4/2013 | Bathurst et al. | |
| 2013/0201280 A1 | 8/2013 | Shen et al. | |
| 2013/0321560 A1 | 12/2013 | Angelo | |
| 2014/0082103 A1 | 3/2014 | Baxter | |
| 2014/0118469 A1 | 5/2014 | Gwilt et al. | |
| 2014/0148934 A1 | 5/2014 | Manley et al. | |
| 2014/0196137 A1 | 7/2014 | Schwebke et al. | |
| 2014/0280595 A1 | 9/2014 | Mani et al. | |
| 2014/0280995 A1 | 9/2014 | Ezell | |
| 2014/0359457 A1 | 12/2014 | Bellan et al. | |
| 2015/0077509 A1 | 3/2015 | Ben Natan et al. | |
| 2015/0124863 A1 | 5/2015 | Ben Natan | |
| 2015/0135207 A1 | 5/2015 | Kitazato et al. | |
| 2016/0112469 A1 | 4/2016 | Liu | |
| 2016/0373696 A1 | 12/2016 | Ben Natan et al. | |

FOREIGN PATENT DOCUMENTS

| | | |
|---|---|---|
| EP | 1830568 A2 | 9/2007 |
| GB | 2349055 B | 3/2004 |

* cited by examiner

SYSTEM AND METHOD THAT BRIDGES COMMUNICATIONS BETWEEN MULTIPLE UNIFIED COMMUNICATION(UC) CLIENTS

CROSS REFERENCE TO RELATED APPLICATIONS

This application claims priority and the benefits of the earlier filed U.S. Provisional Application No. 61/541,990, filed 30 Sep. 2011, which is incorporated by reference for all purposes into this specification.

Additionally, this application is a continuation of U.S. application Ser. No. 13/633,033, filed 1 Oct. 2012, which is incorporated by reference for all purposes into this specification.

TECHNICAL FIELD

This disclosure generally relates to unified communications (UC) client software and applications. More specifically, this disclosure relates to bridging communications between multiple unified communication (UC) client software and applications.

BACKGROUND ART

Several Unified Communications (UC) applications have proliferated into the enterprise communications market. These UC clients may provide many communication tools across multiple devices and media types including audio, video, collaboration (shared whiteboard, application sharing), instant messaging, and also unified messaging (SMS, Voicemail, and Fax). Some examples of commonly used UC clients include Skype, Microsoft Lync, Mirial SoftClient, Vidyo, Avaya, Cisco IP Communicator, etc.

Many of these UC clients have a requirement that they must be usable with hardware devices that can be installed on a Windows Operating System without requiring any additional driver software to be installed. Where USB drivers are used, this means that audio devices must support the standard Windows USB audio driver. In addition, a limitation of the Windows Operating System is that UC clients are generally developed to use only a single audio device. This prevents a UC client from using multiple interface/output devices concurrently.

One limitation of conventional UC clients is that because there are no standards for telephony and UC client specific telephony controls (dial, hangup, mute, etc.), each vendor has developed a proprietary method for implementing these types of commands. For example, Skype uses a methodology in which an API provides the control interface to the client, whereas Microsoft Lync interprets USB HID commands directly from the device. Thus, different UC clients use different interface methodologies for volume and call control functions (e.g.; dialpad, on'off hook, etc.). As a result, hardware interface supporting these UC clients require different firmware and/or software interfaces to support each unique client. The result is that audio device manufacturers must provide UC client specific firmware/software with their hardware devices to enable all of their features to work with each specific UC client.

In addition, if an end user wishes to easily create a multi-party bridged conference call between users registered on different UC clients (e.g. between a user on Lync and another user on Skype), there is no current facility to enable this type of functionality.

The present disclosure includes embodiments that resolve many of the issues found in the art of Unified Communications (UC). Specifically, embodiments are described for implementing a UC bridging architecture wherein a virtual audio device driver interface routes audio streams to a mixer/router interface and also acts to translate vendor specific Human Interface Device (HID) commands to a common format. An HID command translator can be configured to translate commands from the common format to a device specific set of commands. By utilizing a unifying UC architecture, multiple different device firmware implementations are not required to support various UC clients. Furthermore, audio bridging/mixing/routing functionality can be incorporated to allow audio bridging between UC clients, thereby expanding the capability and flexibility of the UC platform and increasing the value of the audio peripherals attached to the system. The present disclosure additionally includes embodiments that allow UC clients to share common interface devices, such as USB audio peripherals, regardless of different HID command implementations.

Other embodiments of the invention include methods, systems, and apparatuses for bridging communications between unified communications (UC) clients. The apparatus may include a UC client driver module with a set of UC client drivers configured to translate UC client specific human interface device (HID) commands to a common format. A UC audio assistant module may be configured to receive the HID commands in the common format and to translate the HID commands from the common format into a device specific format. A device specific driver module with a set of device specific drivers can be configured to pass the HID commands in the device specific format to an output device.

In a further embodiment, the UC audio assistant module is further configured to perform a mix-minus methodology on a UC client audio stream. In one embodiment, the set of UC client drivers comprise virtual audio device drivers. In yet a further embodiment, the set of UC client drivers is configured to translate UC client specific human interface device commands from a plurality of types of UC clients.

In one embodiment, the method includes: receiving a set of HID commands from a UC client; translating the set of HID commands to a common format; translating the set of HID commands from the common format to an output device specific format; and passing the set of HID commands in the output device specific format to a corresponding output device driver.

In another embodiment, the present disclosure discloses a method, system, and apparatus for bridging communications between unified communications (UC) clients. Included herein is a UC client driver module with a set of UC client drivers configured to translate UC client specific human interface device (HID) commands to a common format. Also included is a UC audio assistant module configured to receive the HID commands in the common format and translate the HID commands from the common format into a device specific format. A device specific driver module with a set of device specific drivers is configured to pass the HID commands in the device specific format to an output device.

SUMMARY OF INVENTION

This disclosure describes a system and method that bridges communications between multiple unified communication (UC) clients. This disclosure provides a UC bridging tool configured to execute computer implemented instructions using the processor and memory. The processor is further configured to: receive UC client specific human interface device HID commands from a plurality of UC clients with a UC client driver module, wherein each UC client driver is configured to translate UC client specific human interface device (HID) commands for each UC client driver to a common format; receive HID commands in the common format and translate the HID commands from the common format into a device specific format with a UC audio assistant module; pass the HID commands in the device specific format to an output device with a device specific driver module that further comprises a set of device specific drivers.

The disclosure further provides that the UC audio assistant module is configured to perform a mix-minus methodology on a UC client audio stream.

Additionally, the disclosure provides the set of UC client drivers comprise virtual audio device drivers including a multimedia driver configured to allow transfer of audio streams for one application to another application, and the virtual audio device drivers are configured to receive the audio streams from two or more UC client drivers and mix them into a single audio stream using the common format.

And, the disclosure provides that the set of UC client drivers is configured to translate UC client specific human interface device (HID) commands from a plurality of types of UC clients.

Further, the disclosure provides the UC audio assistant module is configured to pass the HID commands in the common format back to the UC client driver.

BRIEF DESCRIPTION OF DRAWINGS

To further aid in understanding the disclosure, the attached drawings help illustrate specific features and embodiments of the disclosure and the following is a brief description of the attached drawings.

DISCLOSURE OF EMBODIMENTS

This disclosure describes a system and method that bridges communications between multiple unified communication (UC) clients. The disclosed embodiments are intended to describe aspects of the disclosure in sufficient detail to enable those skilled in the art to practice the invention. Other embodiments may be utilized and changes may be made without departing from the scope of the disclosure. The following detailed description is not to be taken in a limiting sense, and the scope of the present invention is defined only by the included claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative functional units includes logical blocks, modules, and circuits described in connection with the embodiments disclosed herein so as to more particularly emphasize their implementation independence. The functional units may be implemented or performed with a general purpose processor, a special purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, any conventional processor, controller, microcontroller, or state machine. A general purpose processor may be considered a special purpose processor while the general purpose processor is configured to fetch and execute instructions (e.g., software code) stored on a computer readable medium such as any type of memory, storage, and/or storage devices. A processor may also be implemented as a combination of computing devices, such as a combination of a DSP and a microprocessor, a plurality of microprocessors, one or more microprocessors in conjunction with a DSP core, or any other such configuration.

In addition, the various illustrative functional units previously described above may include software or programs such as computer readable instructions that may be described in terms of a process that may be depicted as a flowchart, a flow diagram, a structure diagram, or a block diagram. The process may describe operational acts as a sequential process, many of these acts can be performed in another sequence, in parallel, or substantially concurrently. Further, the order of the acts may be rearranged. In addition, the software may comprise one or more objects, agents, threads, lines of code, subroutines, separate software applications, two or more lines of code or other suitable software structures operating in one or more software applications or on one or more processors. The software may be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Figure 3:
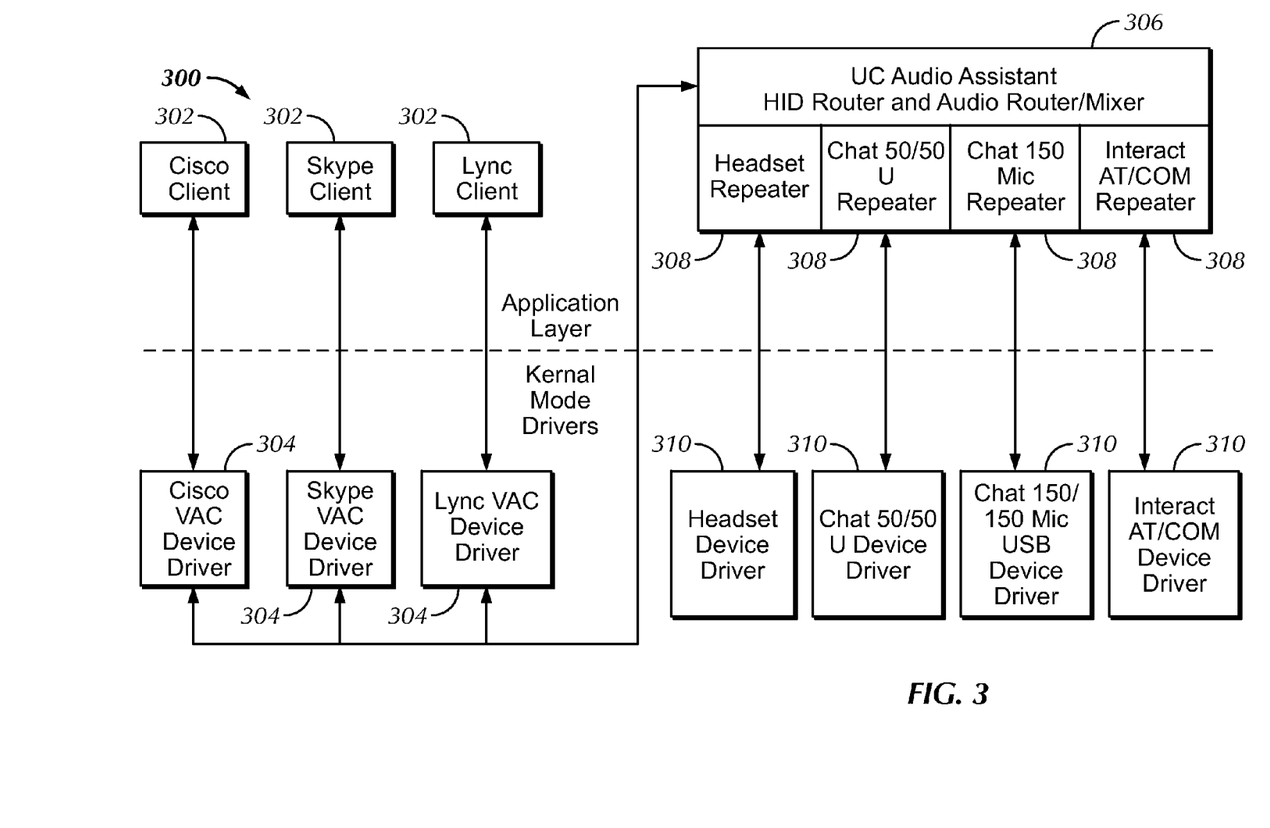
FIG. 3 discloses another embodiment of the disclosed invention.

Elements described herein may include multiple instances of the same element. These elements may be generically indicated by a numerical designator (e.g. 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. For example, where feasible elements in FIG. 3 are designated with a format of 3xx, where 3 indicates FIG. 3 and xx designates the unique element.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second element does not mean that only two elements may be employed or that the first element must precede the second element in some manner. In addition, unless stated otherwise, a set of elements may comprise one or more elements.

Reference throughout this specification to "one embodiment", "an embodiment" or similar language means that a particular feature, structure, or characteristic described in connection with the embodiment is included in at least one embodiment of the present invention. Thus, appearances of the phrases "one embodiment", "an embodiment" and similar language throughout this specification may, but do not necessarily, all refer to the same embodiment.

In the following detailed description, reference is made to the accompanying illustrations, which form a part of the present disclosure, and in which is shown, by way of illustration, specific embodiments in which the present disclosure may be practiced. These embodiments are described in sufficient detail to enable a person of ordinary skill in the art to practice the present disclosure. However, other embodiments may be utilized, and structural, logical, and electrical changes may be made without departing from the true scope of the present disclosure. The illustrations presented in this disclosure are not meant to be actual views of any particular device or system, but are merely idealized representations that are employed to describe embodiments of the present disclosure. Additionally, the illustrations presented are not necessarily drawn to scale. And, elements common between drawings may retain the same or have similar numerical designations.

Figure 1:
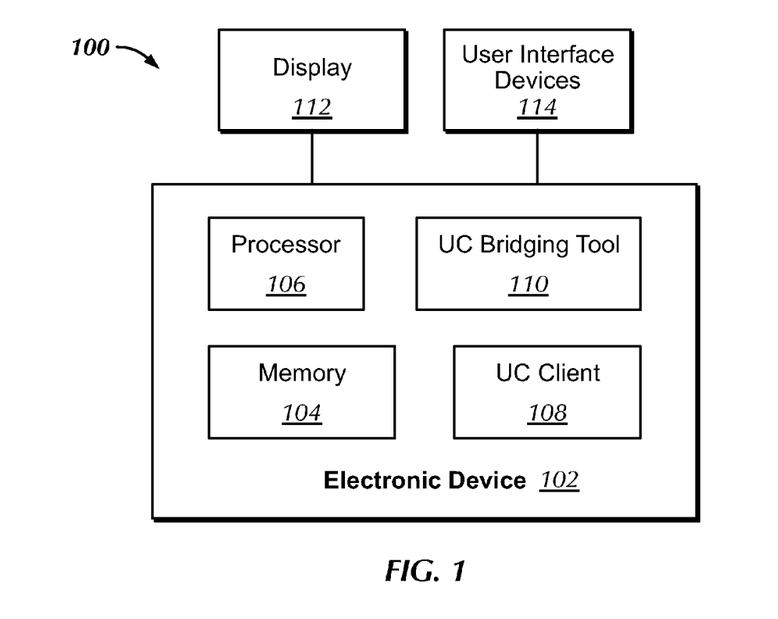
FIG. 1 discloses one embodiment of the disclosed invention.

FIG. 1 depicts one embodiment of a system 100 for bridging communications between Unified Communications (UC) clients. The system 100 includes an electronic device 102 that includes a memory 104 and a processor 106. As will be recognized by one of skill in the art, the electronic device 102 may be a device, such as a personal computer, laptop, client, server, personal digital assistant (PDA), cell phone, smart phone, or the like. In various embodiments, the electronic device 102 may have a UC client 108 installed thereon. A UC client is an application that provides one or more of audio, video, collaboration (shared whiteboard, application sharing), instant messaging, unified messaging (SMS, Voicemail and Fax), or the like. Some examples of commonly used UC clients include Skype, Microsoft Lync, Mirial Softclient, Cisco IP Communicator, etc.

As depicted, the electronic device 102 includes a UC bridging tool 110 that is configured with the logic necessary to bridge communications between different types of UC clients 108. Generally, the UC bridging tool 110 implements a virtual audio device driver interface that routes audio/video/data streams to a mixer/router software interface. The virtual audio device driver interface may support a common set of Human Interface Device (HID) commands between different types of UC clients 108. For example, virtual audio device drivers may be used to translate UC client specific HID commands to a common format that can be handled by an HID translator. The mixer/router interface may be configured to translate the HID commands into device specific commands that can be handled by specific device drivers such as headset device drivers, chat device drivers, USB Microphone device drivers, and other device drivers as recognized by one of skill in the art.

The UC bridging tool 110 may be configured to allow UC clients 108 to concurrently share common hardware. The UC bridging tool 110 may also be configured to bridge audio streams between UC clients 108 running on the same hardware, effectively creating a conferencing bridge between UC clients 108. In a further embodiment, the UC bridging tool 100 may be configured to enable audio to be routed to/from more than one audio device. This may, for example, allow a reference stream to be sent to an echo cancelling audio recording device and an audio output device concurrently. Furthermore, the UC bridging tool 110 may be configured to enable audio streams to be sent to multiple output devices concurrently. For example, a headset can be used concurrently with sound card speakers or other devices.

As depicted, the system 100 may also include a display 112 for displaying graphics, data, images, and the like to the user. The system 100 may also include a set of user interface devices 114 and/or output devices that allow a user to interact with the electronic device 102. Such user interface/output devices 114 may include, but are not limited to, a keyboard, a mouse, a touch screen, a joystick, a touchpad, a microphone, a speaker, a printer, webcam, a digital camera, a scanner, a headset, telephone, Bluetooth device, or the like. The system 100 enables the bridging of audio/data between different UC clients without using an external server to perform the bridging function. The audio/data may be shared between different UC clients 108 running concurrently on the same conferencing platform (e.g., audio from Skype, Lync, Mirial, and other IP phones). Furthermore, the system 100 enables a user to choose which UC client 108 to use without having to purchase multiple hardware platforms and without the need for extensive device firmware support for each UC client 108. In at least one embodiment, the bridging tool 110 is implemented on a single electronic device 102 without utilizing an external server for performing bridging operations.

Figure 2:
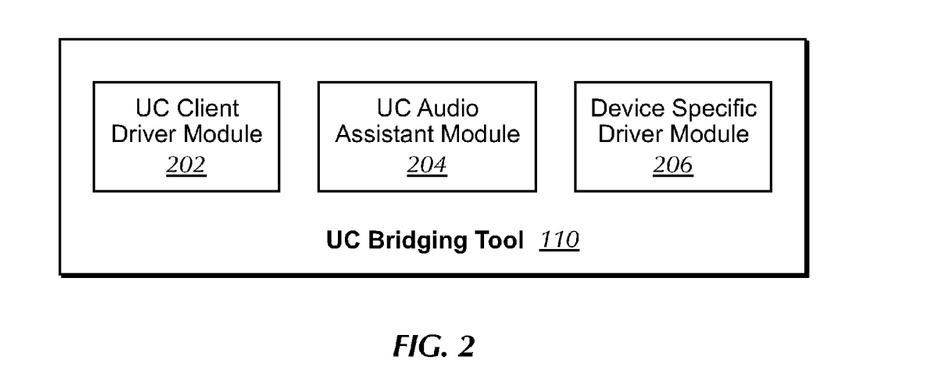
FIG. 2 discloses another embodiment of the disclosed invention.

FIG. 2 depicts one embodiment of the UC bridging tool 110 for bridging communications between different types of UC clients 108. In the depicted embodiment, the UC bridging tool 110 includes a UC client driver module 202, a UC audio assistant module 204, and a device specific driver module 206. Of course in various embodiments, the different modules may be combined, split, labeled differently, implemented across multiple electronic devices, or the like as will be recognized by one of skill in the art.

The UC client driver module 202, in one embodiment, comprises virtual audio device drivers that are configured to support a common set of HID commands specific to each UC client 108. Virtual audio device drivers typically include a multimedia driver that allows a user to transfer audio streams from one application to another. Thus, a first application is able to send an audio stream to the input side of a virtual audio device driver while a corresponding application can receive the stream from the output side. Since all transfers are typically made digitally, there is no loss of audio sound quality. In some embodiments, virtual audio device drivers may be used by more than one UC client or other application to send audio through an output virtual audio device and the virtual audio devices may be configured to mix all of the streams together or to create separate corresponding virtual input devices. Similarly, multiple UC clients or other applications may be configured to receive audio from a virtual audio device, whether it's sharing the same audio data with another target or receiving its own audio stream. In one embodiment, a virtual audio device driver may include virtual audio cables and/or may be integrated with such virtual audio cables.

In one embodiment, the UC client driver module 202 includes kernel mode drivers, including virtual audio device drivers, for routing audio/data streams to the UC audio assistant module 204. The virtual audio device drivers may also be configured to translate client specific HID commands to a common format and/or device agnostic format. The virtual audio device drivers may also be configured to pass the common format HID commands to an HID translator of the UC audio assistant module 204. The virtual audio device drivers may also receive common format HID commands back from the HID translator to pass them back to the UC client 108.

The UC audio assistant module 204 receives common format HID commands from the UC client driver module 202 and may be configured to route incoming UC client 108 audio streams to one or more specific interface/output devices 114. In one embodiment, the UC audio assistant module 204 may optionally mix audio streams from the UC clients 108 using mix technologies such as a mix-minus methodology. A mix-minus methodology is a methodology where the output to a certain device contains everything except the input from that device. This prevents echoes or feedback from reverberating or howling and squealing through a sound system. Other mixing methodologies are also contemplated herein as recognized by one of skill in the art.

In one embodiment, the UC audio assistant module 204 may be further configured to route incoming UC client audio/data streams to one or more interface/output devices 114. Routing the incoming UC client audio/data streams may include routing device audio/data streams to a conferencing client, or potentially multiple conferencing clients. In one embodiment, the UC audio assistant module 204 may include an HID translator that receives HID commands in the common format and translates the HID commands to a device specific format. HID commands in the device specific format may then be passed to specific interface/output devices 114 by way of repeaters associated with the output devices. A repeater is an electronic device that receives a signal and retransmits it at a different level and or different power, or that amplifies, reshapes, retimes, or performs a combination of operations on the signal. In a further embodiment, the UC audio assistant module 204 may be configured to access output device specific drivers that are used to pass HID commands in a device specific format to the corresponding output devices. The UC audio assistant module 204 may also pass commands in a reverse order from output devices back to a UC client 108. This may include translating output device specific formats back to the common format, and then translating the common format back to a UC client specific format.

The UC audio assistant module 204 may also be configured to re-direct incoming device specific HID commands to another device. For example, volume control may be redirected from a first interface/output device 114 (e.g., headset) to second interface/output device 114 (e.g., sound card speaker). In one embodiment, a particular device may be designated by the UC audio assistant module 204 to act as a default device. For example, a particular audio device may be designated as a volume control master such that the volume controls associated with that particular device control the volume of multiple attached output devices.

In certain embodiments, some UC clients 108 may not accept certain HID commands for all functions. For example, Skype is not conventionally configured to accept HID commands for volume, mute and hangup events. In such embodiments, the UC audio assistant module 204 may intercept HID commands for these functions and translate them into UC client 108 specific application programming interface (API) commands (e.g. Skype API commands). Then, the UC audio assistant module 204 may interface with the UC client 108 directly using the translated API commands. Thus, the UC audio assistant module 204 may use various methods to interpret general device driver telephony commands and forward them to corresponding UC clients 108. Some of these methods may include, but are not limited to, translating HID commands and forwarding the translated commands to a virtual device driver (e.g. for Lync) and translating device driver or USB HID command translation to or from UC client specific API or messaging interfaces (e.g. for Skype). In such embodiments, the virtual device drives may still be utilized to interface with the UC clients 108 and bridge communications between them. However, there may be UC client specific virtual device drivers to support additional telephony command translation.

A graphical user interface (GUI), or other type of interface, may be provided to map the architecture between multiple output devices and multiple UC clients. The GUI may be configured to allow an active output device to be switched dynamically. For example, an audio output may be changed from a headset to a speaker during a call without accessing the UC client interface. If only one output device is available, then all applications may use that device by default. However, where multiple output devices are available, the GUI may be configured to enable more than one UC client to be active at the same time by utilizing the multiple output devices respectively. For example, a first UC client may utilize a head set device at the same time that a second UC client is utilizing a webcam device.

FIG. 3 depicts one embodiment of a system 300 for bridging communications between multiple UC clients and multiple output devices. As depicted, multiple UC clients 302 are implemented in an application layer of an electronic device 102. The depicted UC clients 302 include a Cisco Client, a Skype Client, and a Lync Client. However, other types of UC clients are contemplated herein. In the depicted embodiment, each of the UC clients 302 accesses a corresponding virtual audio device driver 304 at the kernel mode level. The virtual audio device drivers 304 may comprise the UC client driver module 202 as described above. In one embodiment, the Cisco Client accesses a Cisco virtual audio device driver, the Skype Client accesses a Skype virtual device driver, and the Lync Client accesses a Lync virtual device driver. In one embodiment, the corresponding virtual device drivers operate to translate HID commands from the UC clients 302 into a common format. Thus the Cisco virtual device driver translates Cisco specific HID commands into a common format, and the Skype virtual audio device driver translates Skype specific HID commands into the common format. Similarly, in a reverse operation, the Cisco virtual audio device driver may translate HID commands from the common format back into Cisco specific HID commands. In this manner, the virtual audio device drivers 304 operate to pass HID commands and other information between the UC clients 302 and the UC audio assistant 306.

The UC audio assistant 306 may comprise the UC audio assistant module 204 as described above. As depicted the UC audio assistant 306 may include an HID translator and an audio router/mixer. The HID translator may be configured to translate HID commands from the common format provided by the virtual audio device drivers 304 into device specific formats that can be provided to specific output devices. The audio router/mixer may be configured to route audio to specific output devices and to perform mixing methodologies on the audio streams where desirable. As noted above, the audio router/mixer may be configured to perform mixing methodologies such as mix minus for audio streams.

The UC audio assistant 306, in the depicted embodiment, includes repeaters 308 corresponding to each output device. This embodiment includes a headset repeater, a Chat 50/50U repeater, a Chat 150 mic repeater, and an Interact AT/COM repeater (all devices are made by the Applicant of the present disclosure, ClearOne, Inc.). However, other repeaters from other manufacturers may also be used depending on which output devices are available for use. The repeaters 308 operate to pass device specific HID commands to device specific drivers 310. As depicted, a device specific driver 310 is provided in the kernel mode layer for each available output device. The device specific drivers 310 facilitate communication between the UC audio assistant 306 and the specific output devices. In the depicted embodiment, a headset device driver, a Chat 50/50U device driver, a Chat 150/150 mic USB device driver, and an Interact AT/COM device driver are provided with corresponding repeater device 308.

In this manner, each UC client 302 may be utilized with each output device without the need for different device firmware implementations to support each different UC client 302. Furthermore, the audio bridging/mixing/routing functionality of the audio assistant 306 allows bridging between audio/data streams associated with the UC clients 302.

Figure 4:
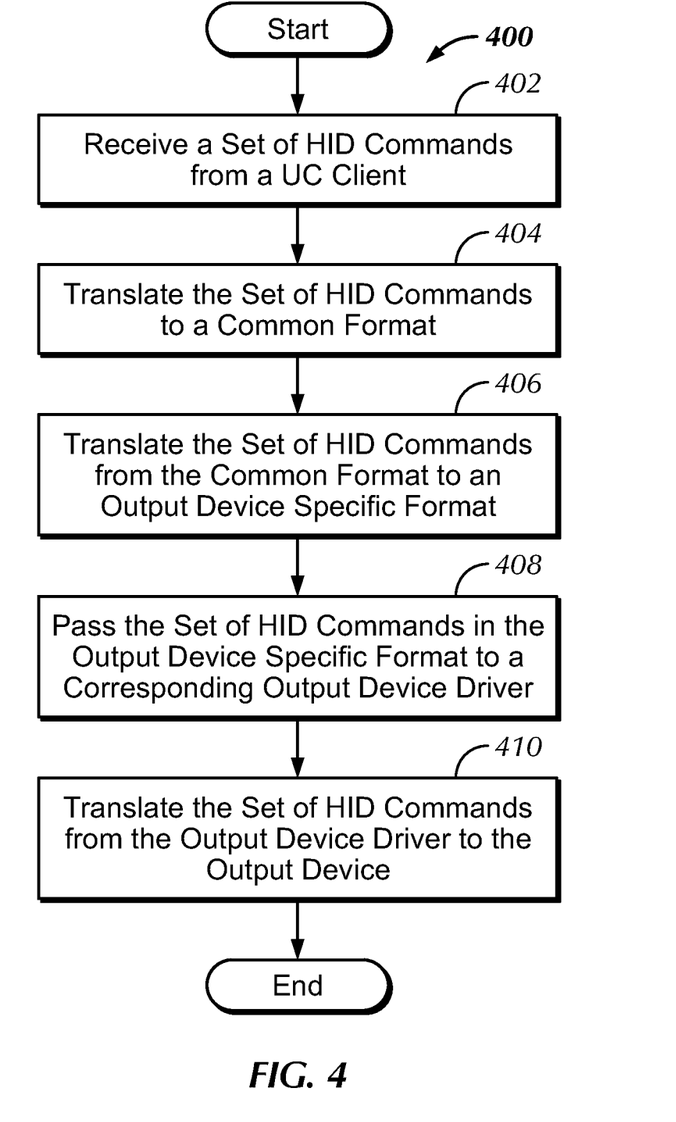
FIG. 4 discloses a flow chart diagram of one embodiment of the disclosed invention.

FIG. 4 depicts one embodiment of a method 400 for bridging communications between UC clients. The method 400 substantially includes and relates the embodiments and implementations described above with regard to the other figures of the present disclosure.

The method 400 begins when a set of HID commands is received 402 from a UC client 102. The HID commands are typically in a format specific to the UC client 102. Next, a UC client driver module 202 translates 404 the set of HID commands into a common format. Thus, commands from different types of UC clients 102 may be translated into the same common format. Next, a UC audio assistant module 204 translates 406 the set of HID commands from the common format to an output device specific format. The set of HID commands in the output device specific format may be passed 408 to a corresponding output device driver of a device specific driver module 206. The device specific driver module 206 passes 410 the set of HID commands from the output device driver to the output device for output to a user. The method 400 may also operate in a reverse manner to pass HID commands from a specific output device back to a specific UC client 102.

While the present disclosure has been described herein with respect to certain illustrated and described embodiments, those of ordinary skill in the art will recognize and appreciate that the present disclosure is not so limited. Rather, many additions, deletions, and modifications to the illustrated and described embodiments may be made without departing from the true scope of the invention, its spirt, or its essential characteristics as hereinafter claimed along with their legal equivalents. In addition, features from one embodiment may be combined with features of another embodiment while still being encompassed within the scope of the invention as contemplated by the inventor. The described embodiments are to be considered in all respects only as illustrative and not restrictive. All changes which come within the meaning and range of equivalency of the claims are to be embraced within their scope. The disclosure of the present invention is exemplary only, with the true scope of the present invention being determined by the included claims.

We claim the following invention:

1. An apparatus that bridges communications between multiple unified communication (UC) clients by receiving, translating, and routing commands to one or more output devices, comprising:
   a UC bridging tool configured to execute computer implemented instructions using the processor and memory, the processor configured to:
   receive UC client specific human interface device HID commands from a plurality of UC clients with a UC client driver module, where each UC client driver module comprises one or more virtual audio device drivers that further include a multimedia driver configured to allow the transfer of audio streams for one UC client to another UC client, each virtual audio device driver is configured to receive the audio streams from two or more UC client drivers and mix them into a single audio stream using the common format, each UC client driver module is configured to translate UC client specific human interface device (HID) commands for each UC client driver module to a common format;
   receive the HID commands in the common format and translate the HID commands from the common format into a device specific format with a UC audio assistant module; and
   route the translated HID commands in the device specific format from the UC audio assistant module to one or more output devices with a device specific driver module that further comprises a set of device specific drivers.

2. The claim according to claim 1 where the UC audio assistant module is further configured to perform a mix-minus methodology on a UC client audio stream.

3. The claim according to claim 1 where the set of UC client drivers is configured to translate UC client specific human interface device (HID) commands from a plurality of types of UC clients.

4. The claim according to claim 1 where the UC audio assistant module is configured to pass the HID commands in the common format back to the UC client driver.

5. A method to make an apparatus that bridges communications between multiple unified communication (UC) clients by receiving, translating, and routing commands to one or more output devices, comprising:
   providing a UC bridging tool configured to execute computer implemented instructions using the processor and memory, the processor configured to:
   receive UC client specific human interface device HID commands from a plurality of UC clients with a UC client driver module, where each UC client driver module comprises one or more virtual audio device drivers that further include a multimedia driver configured to allow the transfer of audio streams from one UC client to another UC client, each virtual audio device driver is configured to receive the audio streams from two or more UC client drivers and mix them into a single audio stream using the common format, each UC client driver module is configured to translate UC client specific human interface device (HID) commands for each UC client driver module to a common format;

receive the HID commands in the common format and translate the HID commands from the common format into a device specific format with a UC audio assistant module; and route the translated HID commands in the device specific format from the UC audio assistant module to one or more output devices with a device specific driver module that further comprises a set of device specific drivers.

6. The claim according to claim 5 where the UC audio assistant module is further configured to perform a mix-minus methodology on a UC client audio stream.

7. The claim according to claim 5 where the set of UC client drivers is configured to translate UC client specific human interface device (HID) commands from a plurality of types of UC clients.

8. The claim according to claim 5 where the UC audio assistant module is configured to pass the HID commands in the common format back to the UC client driver.

9. A method to bridge communications between multiple unified communication (UC) clients by receiving, translating, and routing commands to one or more output devices, comprising:

configuring a UC bridging tool to execute computer implemented instructions using the processor and memory, the processor configured to:

receive UC client specific human interface device HID commands from a plurality of UC clients with a UC client drive module, where each UC client driver module comprises one or more virtual audio device drivers that further include a multimedia driver configured to allow the transfer of audio streams for one UC client to another UC client, each virtual audio device driver is configured to receive the audio streams from two or more UC client drivers and mix them into a single audio stream using the common format, each UC client driver module is configured to translate UC client specific human interface device (HID) commands for each UC client driver module to a common format;

receive the HID commands in the common format and translate the HID commands from the common format into a device specific format with a UC audio assistant module; and route the translated HID commands in the device specific format from the UC audio assistant module to one or more output devices with a device specific driver module that further comprises a set of device specific drivers.

10. The claim according to claim 9 where the UC audio assistant module is further configured to perform a mix-minus methodology on a UC client audio stream.

11. The claim according to claim 9 where the set of UC client drivers is configured to translate UC client specific human interface device (HID) commands from a plurality of types of UC clients.

12. The claim according to claims claim 9 where the UC audio assistant module is configured to pass the HID commands in the common format back to the UC client driver.

13. A non-transitory program storage device readable by a computing device that tangibly embodies a program of instructions executable by the computing device to perform a method to bridge communications between multiple unified communication (UC) clients by receiving, translating, and routing commands to one or more output devices, comprising:

configuring a UC bridging tool to execute computer implemented instructions using the processor and memory, the processor configured to:

receive UC client specific human interface device HID commands from a plurality of UC clients with a UC client driver module, where each UC client driver module comprises one or more virtual audio device drivers that further include a multimedia driver configured to allow the transfer of audio streams for one UC client to another UC client, each virtual audio device driver is configured to receive the audio streams from two or more UC client drivers and mix them into a single audio stream using the common format, each UC client drive module is configured to translate UC client specific human interface device (HID) commands for each UC client driver module to a common format;

receive the HID commands in the common format and translate the HID commands from the common format into device specific format with a UC audio assistant module; and route the translated HID commands in the device specific format from the UC audio assistant module to one or more output devices with a device specific driver module that further comprises a set of device specific drivers.

14. The claim according to claim 13 where the UC audio assistant module is further configured to perform a mix-minus methodology on a UC client audio stream.

15. The claim according to claim 13 where the set of UC client drivers is configured to translate UC client specific human interface device (HID) commands from a plurality of types of UC clients.

16. The claim according to claim 13 where the UC audio assistant module is configured to pass the HID commands in the common format back to the UC client driver.

* * * * *

UNITED STATES PATENT AND TRADEMARK OFFICE
CERTIFICATE OF CORRECTION

PATENT NO. : 9,935,915 B2
APPLICATION NO. : 15/151046
DATED : April 3, 2018
INVENTOR(S) : Peter H. Manley et al.

It is certified that error appears in the above-identified patent and that said Letters Patent is hereby corrected as shown below:

On the Title Page

Item (54), and in the Specification, Column 1, Line 3, in "Title", delete "UNFIED COMMUNICATION(UC)" and insert -- UNIFIED COMMUNICATION (UC) --, therefor.

In the illustrative figure "Kernal" should read -- Kernel --.

In the Drawings

On sheet 2 of 3, in Figure 3, Line 11, delete "Kernal" and insert -- Kernel --, therefor.

In the Specification

In Column 7, Line 54, delete "and or" and insert -- and/or --, therefor.

In the Claims

In Column 12, Line 11, in Claim 12, after "to" delete "claims".

Signed and Sealed this
Third Day of July, 2018

Andrei Iancu
*Director of the United States Patent and Trademark Office*